July 31, 1928.
F. F. FORSHEE
1,678,856
CURRENT INDICATING AND ILLUMINATING MEANS FOR ELECTRIC RANGES
Filed March 10, 1922
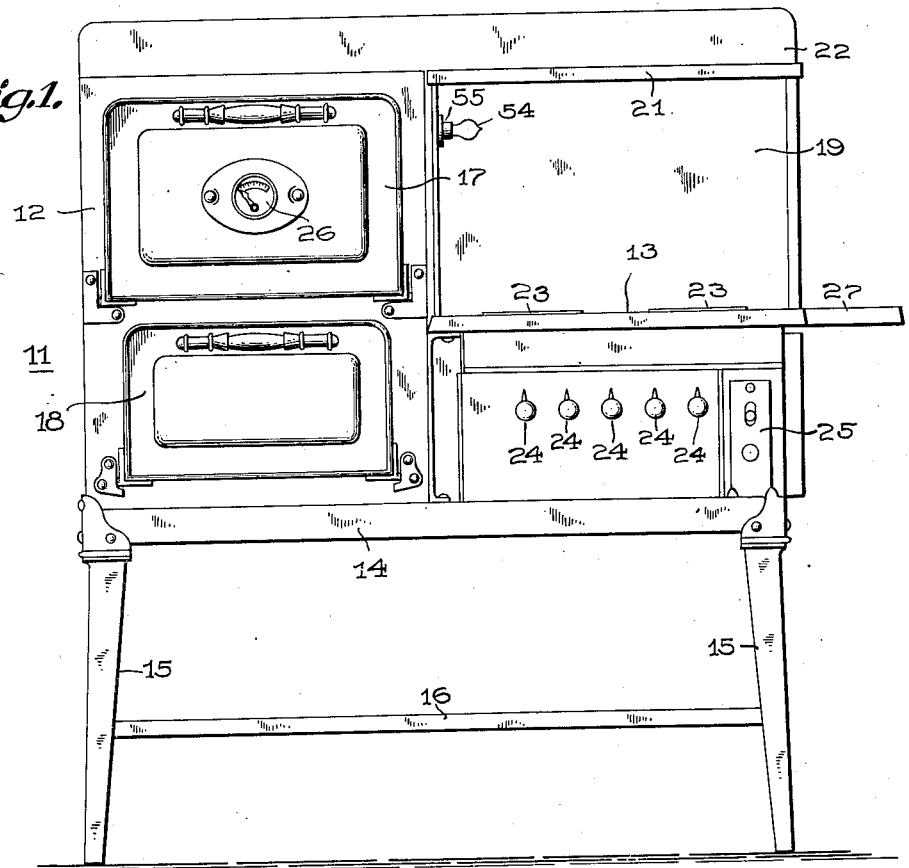
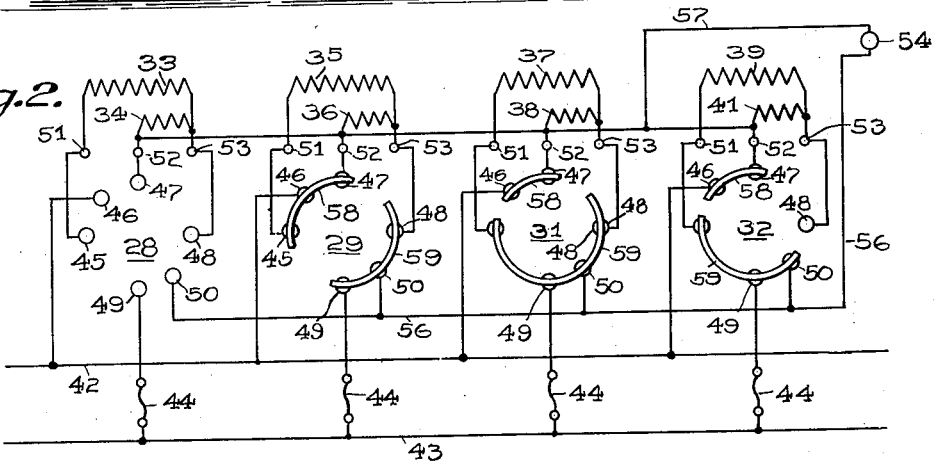
WITNESSES:
R. S. Harrison
H. M. Biebel
INVENTOR
Frank F. Forshee
BY
Wesley G. Carr
ATTORNEY Patented July 31, 1928.

1,678,856

UNITED STATES PATENT OFFICE.

FRANK F. FORSHEE, OF FLINT, MICHIGAN, ASSIGNOR, BY MESNE ASSIGNMENTS, TO WESTINGHOUSE ELECTRIC & MANUFACTURING COMPANY, OF EAST PITTSBURGH, PENNSYLVANIA, A CORPORATION OF PENNSYLVANIA.

CURRENT-INDICATING AND ILLUMINATING MEANS FOR ELECTRIC RANGES.

Application filed March 10, 1922. Serial No. 542,617.

My invention relates to electrically heated apparatus and particularly to electric ranges and it has for its object to provide a relatively simple and inexpensive current-indicating and range-illuminating device that shall be effective to indicate current flow through any of the heating elements of said range and, at the same time, illuminate the stove top.

In an electric range comprising an oven in which one or more heating elements may be located, or a stove top in which a plurality of enclosed or covered heating elements are located, the heating elements being controlled respectively by multi-heat or plural-position switches, one or more of the switches may be left in the "low" position, after the cooking operation has been completed, for a relatively long time before it is noted that current is still traversing the heating element controlled by said switch. My invention has particular reference to means for illuminating the stove top and for visually indicating to the operator that current is traversing a heating element of the range and it embodies a single low-wattage incandescent lamp mounted on the range and so connected to the terminals of a plurality of three-heat switches employed to control the energization of the heating elements, that it is energized by the movement of any one of said switches to any one of its energizing positions.

In the single sheet of drawings:

Figure 1 is a view, in front elevation, of an electric range comprising the system embodying my invention.

Fig. 2 is a diagram of connections of a plurality of heating units employed in a range of the above indicated character with which is combined the system embodying my invention.

An electric range, designated generally by the numeral 11, comprises two parts, viz an oven part 12 and a stove part 13 located in side-by-side relation on a suitable supporting platform 14 which is provided with a plurality of supporting members 15. A crossbrace 16 may be employed to suitably connect the supporting members 15 to stiffen the entire structure. A door 17 permits of access to the upper portion of the chamber of the oven and a second door 18 permits of access to the lower portion of the chamber of the oven. The stove part 13 is provided with a back wall 19, an upper shelf member 21 and a shelf back 22.

A plurality of heating elements 23 are located in the top of the stove part 13 and may be of the type described and claimed in my Patent, No. 1,376,415.

The heating elements of the stove and the heating element of the oven are severally controlled by multi-heat or plural-position switches, the actuating knobs or handles 24 of which are shown in Fig. 1 as being mounted at the front of, and immediately below, the stove part of the range, although this location is not essential. An electromagnetic circuit-interrupting means 25, only the operating handles of which are illustrated in Fig. 1, may be employed to suitably control the heating element of the oven, a thermostat 26 being mounted in the door 17 to control the circuit-interrupting means in any well-known or desired manner.

An extension shelf 27 may be located at the side of the stove top 13 to provide additional space for placing thereon such cooking utensils as are not immediately needed.

Referring more particularly to Fig. 2 of the drawing, I have illustrated a plurality of multi-heat, or three-heat, or plural-position switches, numbered 28, 29, 31 and 32, respectively, for purposes of reference thereto. The heating elements of the range are designated by the two-part resistor members 33 and 34, controlled by the switch 28, resistors 35 and 36, controlled by the switch 29, resistors 37 and 38 controlled by the switch 31, and resistors 39 and 41, controlled by the switch 32. The two resistor members 33 and 34 may be considered as being located in the oven and the two-part resistors controlled by the switches 29, 31 and 32 may be considered as constituting the heating elements 23 of the stove part of the range. A supply circuit comprises two conductors 42 and 43. Fuses 44 are provided for the switches 28, 29, 31 and 32, respectively. Six stationary contact members are provided on each of the switches 28, 29, 31 and 32 and are here numbered 45, 46, 47, 48, 49 and 50, respectively. The two resistor members of each heating element are so connected relatively to each other as to provide three ends which are connected, respectively, to switch terminal members 51, 52 and 53, which are, in turn, connected to the contact members 45, 47 and 48, respectively. The contact members 46 and 49 of each switch are connected to the conductors 42 and 43 of the supply circuit.

A current-indicating member 54, comprising a low-wattage incandescent lamp, is mounted against the inner wall of the oven in a suitable socket member 55 so located as to bring the lamp 54 over the stove top. One terminal of the lamp 54 is connected to the contact terminal 50 of all of the control switches by a conductor 56, and the other terminal is connected, by a conductor 57, to the terminal member 52 of each of the switches 28, 29, 31 and 32.

Switch 28 is illustrated as being in its open position and, therefore, no current is traversing either of the resistor members 33 and 34. Switch 29 is illustrated as having been moved from its open position to its "high" position, connecting members 58 and 59 being illustrated as respectively connecting certain of the contact members of the switch in such manner as to cause the two resistor members 35 and 36 to be connected in parallel-circuit relation to each other. Switch 31 is illustrated as having been moved to the "intermediate" position, the members 58 and 59 being drawn to a different scale to suitably connect the proper contact members of the switch to permit current to traverse resistor member 38 only. Switch 32 is illustrated as having been moved to its "low" position, certain of the contact members of the switch now being connected in such manner that the current traverses the resistor members 41 and 39 in series-circuit relation, thus reducing the current to the "low" value. The switches 29, 31 and 32 are to be understood as being illustrated schematically only, as, of course, the actual construction of the switch is somewhat different, particularly with regard to the construction of the members 58 and 59. However, the connections established by the switches are substantially as indicated in Fig. 2. It may be noted that the switch 28 does not permit of energizing the visual current-indicating member 54 but that the switches 29, 31 and 32, individually permit of energizing the member 54 with the full potential of the supply circuit. By connecting a single small incandescent lamp, as shown in Fig. 2, and mounting it substantially in the position illustrated in Fig. 1 of the drawing, I provide a visual means for indicating the flow of current through any of the heating elements of the range, irrespective of which of the energizing positions any one of the switches may occupy and I provide also an illuminating means for the stove top, which means is energized as soon as any one of the switches controlling the heating elements of the stove top is moved to an energizing position.

I am aware that a system has been patented comprising a single-position switch provided with an extra contact member to which a visual indicating means is connected but my invention provides a relatively simple and easily installed visual indicator to permit of indicating current flow through any one of the heating elements controlled by plural-position switches. By mounting the visual indicating means on the upper part of the range, it cannot fail to be noticed by the operator and hence will be effective to call the operator's attention to the fact that current is still traversing any one or more of the heating elements of the range. It is effective also to illuminate the stove top as soon and as long as any one of the heating elements is energized.

Various modifications may be made in the device embodying my invention without departing from the spirit and scope thereof and I desire that only such limitations shall be placed thereon as are imposed by the prior art or are specifically set forth in the appended claims.

I claim as my invention:

1. In combination, supply mains, a plurality of sets of translating devices connected in multiple across said mains, a corresponding plurality of multiposition switches each connecting the translating devices of its respective set in different relations, a pilot lamp, and connections between one of the mains and said lamp and between the lamp and the switches in multiple for lighting said lamp in any one of the closed positions of any of the switches.

2. In an electric stove, supply mains, a plurality of heating elements connected in multiple across said mains and each consisting of a plurality of heating resistances, a corresponding plurality of multiposition switches each connecting one of the resistances of the respective elements, alone, both together in series or both in parallel, a pilot lamp, and connections between the lamp and the switches in multiple for lighting said lamp in any one of the closed positions of any of the switches.

3. In a device of the class described, a source of current, a plurality of electrical translating devices, a multiposition switch for connecting said translating devices in different relations, a pilot lamp and connections between said switch and lamp and between said source and lamp for lighting said pilot lamp at the full voltage of said lamp in any of the circuit-closing positions of said switch.

4. In an electric stove, a source of current, a heating element consisting of a plurality of resistances, a multiposition switch for connecting one of said resistances singly, or both together in series or both in parallel, a pilot lamp, and connections between said switch and pilot lamp and between said source and lamp for lighting said lamp under full voltage in any of the circuit-closing positions of said switch.

5. In a device of the class described, a source of current, a range top, a plurality of electrical translating devices for heating the top, a multiposition switch for connecting said translating devices in different relations, a pilot lamp and connections between said switch and lamp and between said source and lamp for lighting said pilot lamp at the full voltage of said lamp in any of the circuit-closing positions of said switch, said pilot lamp being positioned to illuminate the range top.

6. In apparatus of the class described, in combination, a source of electrical energy, a plurality of energy-translating devices, a multiposition switch for connecting said translating devices in any one of a plurality of circuit relations, a pilot lamp, means for connecting both terminals of the pilot lamp to the energy source through contact terminals of the switch to ensure disconnection of both terminals of the pilot lamp from the source of electrical energy when the movable member of the switch is in its off position and the impression of full voltage thereon at each operative position of said member.

7. The combination with a plural-resistor heating element, of a source of electrical energy, a pilot lamp and a multiposition switch having a plurality of stationary contact terminals severally connected to said source, to the terminals of said resistors and to the terminals of said lamp and a movable member for engaging said contact terminals to connect said resistors in a plurality of different heat-producing relations without disturbing full-voltage supply to the lamp and for disconnecting both lamp terminals from the energy source when in its off position.

8. In an electric range, the combination with a stove top, a plurality of heating elements for said stove top, and a plurality of multi-heat switches for selectively and variably controlling the energization of said heating elements, of a single indicating means, and conductors for electrically connecting the indicating means to corresponding points of all of said switches so that the indicating means is normally energized by the movement of any one of said switches to any one of their energizing positions.

In testimony whereof, I have hereunto subscribed my name this 16th day of February, 1922.

FRANK F. FORSHEE.